United States Patent Office.

CHARLES HEATON, OF NEW YORK, N. Y.

Letters Patent No. 68,363, dated September 3, 1867.

---

IMPROVEMENT IN PREPARING AND TREATING VEGETABLE FIBRES.

---

The Schedule referred to in these Letters Patent and making part of the same.

---

TO ALL WHOM IT MAY CONCERN:

Be it known that I, CHARLES HEATON, of the city, county, and State of New York, have invented a new and improved Method of Preparing and Treating Crude Vegetable Fibrous Material, for the purpose of utilizing the fibre of the same to be used in the arts; and I do hereby declare that the following is a full, clear, and exact description of my method of proceeding and treatment.

Before describing my invention it is necessary, for the proper understanding of the subject, that I should make the following remarks:

Bamboo, and other like large-jointed productions, (which I prefer to treat by my process,) being found in hot climates, usually have to be carried from the place of their production to the place of consumption; and among other obstacles to their treatment and conversion into fibre, have the following disadvantages: When bamboo has been cut and stored away it is found to produce, in large quantities, an insect or bug of the beetle order, which seems to be taken up into the plant, in the egg form, during its growth. I have found this insect within the solid wood of bamboo, into which it has eaten long burrows, without being able to find any place where it had entered into the plant. I have also fermented bamboo, and have then found it to be full of insect life in the form of small white maggots, which may or may not be another form of the same insect brought into existence by the process of fermentation, but which certainly shows that insect life is taken up in the growth of the plant. This insect or bug is very destructive to the fibre, as well as to all wood-work adjoining the stored crude material, and also highly detrimental to the quality of paper made from bamboo, when paper is made from it. Another inherent disadvantage to bamboo as a fibre-producing material is its bulk. It is a very light and a very hard, unyielding material, and its shipment in the crude state is attended with great comparative expense. It is so light that after it has been split up and baled or pressed as much as practicable, a vessel of capacity to carry one hundred and sixty tons of ordinary freight can only carry forty-three tons of baled bamboo. Bamboo, as is well known, is a hollow structure, furnished at intervals with joints, like straw. At each of these joints there is a hard and tenacious diaphragm or partition, which prevents the material, in its crude state, from being baled solidly, unless each separate piece is put through rollers or otherwise crushed; and even after crushing it will be found to be so tenacious of its original form, and so elastic, as to go back to that form and be very hard to bale solidly. Should it be found worth while to arrange presses to bale it solidly, there is still the bug or insect before mentioned to be contended against.

The object of my invention is to overcome each of these disadvantages, and to extract the fibre from such material without increasing the cost of such extraction; and to this end I place the crude material into a solution of caustic alkali of about the following proportions: To each ton of crude bamboo, dry, I propose to use and do use, two hundred pounds of hydrate of potassa (KO, HO,) of commerce, or its equivalent of soda-ash, ($Na_2O, CO_2 \times HO$,) which I make caustic by quicklime in the ordinary manner, and to which I add enough water to form a solution of the bulk necessary to cover the ton of bamboo to be softened. This softening may be effected either in open tanks, and cold, or in closed vessels, and hot, the object being to soak the bamboo in the alkaline solution until it has become softened; but care should be taken, in using closed boilers and heat or pressure, not to carry the heat too high, or the material under treatment will be disintegrated and injured, as I will hereafter show. If I use closed vessels and heat, I find that in from two to three hours the bamboo has become quite soft, and that it offers no resistance to being baled. If I use an open tank instead of a closed vessel, and apply no heat, I find it takes two or three days to produce the same effect or soft condition of the material, but that in all other respects the condition is the same, namely, the crude material is reduced to a soft, yielding condition without having become disintegrated, and without having changed its conformation. In the course of from one to two days, depending on the climate, the soft material, on being taken out of the solution which softened it, becomes hard again, and with the exception of having become shrunk or shrivelled up a little, and having also changed color, looks as it did before being subjected to treatment. Before this takes place, and while it is soft, I press it into bales, if I wish to transport it; and I find that with the same application of power and the same press used to bale the crude material, I can easily press three times as much bamboo, which has been softened as I describe, into the space occupied by one-third the quantity of unsoftened or crude bamboo; thus enabling a vessel which would only carry forty-three tons of the crude material to carry one hundred and twenty-nine tons of prepared material, and therefore reducing the cost of transportation two-thirds. In addition to this saving in transportation, I find the insects or eggs before alluded to are all destroyed, so that the prepared material may be stored for any length of time without depreciating in its nature, and also that the absorption of oxygen, which goes on for a long time after softening, greatly facilitates the reduction to pulp or fibre whenever it may be necessary to disintegrate it. The cost of chemical for softening cannot be taken as an offset to the saving in the cost of transportation, as the same chemical, or chemical of equal cost, would have to be used in any case to convert the crude material into fibre; the only difference being that by my method of proceeding I allow an indefinite time to elapse between the application of the chemical to soften and the mechanical reduction of the softened material to pulp or fibre, which, in addition to enabling me to save in cost of transportation and destroy animal life, as before mentioned, also results in a great saving of chemical, because when material has been softened by an alkaline solution it becomes greedy for oxygen, which it absorbs, so that while it is lying in store or awaiting disintegration, an action which costs nothing is going on, which renders the subsequent reduction or disintegration more easy, and also enables me to obtain a better product than I could do by any other process.

If it is required to make the material which has been softened and baled into brown paper, I simply untie the bale of prepared material and place it in a tank, tub, or other convenient vessel, and cover it over with cold water, and allow it to remain in the same from six to twelve hours, when it swells up to its original size and becomes so soft and unresisting that it can be rubbed into fibre in the hands with ease. I now drain off the water, which has become of a dark, rich brown, or coffee color, and wash the material by causing hot or cold water to fall among it. When it is washed comparatively clean, so that the water which runs off is no longer highly colored, I transfer the material to the ordinary paper-maker's beating engine, (used in all paper-mills, and sometimes called the rag engine,) and beat the fibres apart and reduce it to pulp in the same way that rags are reduced, and make it into paper in the ordinary manner.

For white paper, the material has to be treated differently, but such additional treatment forms no part of this specification.

By washing the softened material before disintegrating it, I find I avoid wasting the fibre, and get, as a consequence, a much greater yield of fibre from a given quantity of material. I also find when paper is made, that it is better and stronger than would have been made from the same material by any other known process; and whatever may be the use made of bamboo thus softened, it will be found that the softening process to which it has been subjected will have improved its condition, and it will be found that notwithstanding the softened material becomes hard again, there is so much chemical stored up in it for future use to be made available at any time and put into energetic action by simply adding cold water. In the case of brown paper, as above shown, the material may be reduced to pulp and made into paper by mechanical action and simple cold water, without any additional chemical treatment whatever.

It is necessary for me to make some remarks, which I will make as brief as possible, in order to make quite clear what might otherwise be considered a very fine distinction, but which in reality is a very broad one, and a new and novel method of proceeding.

Vegetable fibrous material had been made into paper for a long time prior to my invention, I am aware, and caustic alkaline solutions have been used for the purpose of reducing the crude material to pulp. In all cases where caustic alkali has been used it has, I believe, always been the custom to boil such crude fibrous materials as are suitable for paper-making with caustic alkali, but such boiling has always been carried on for the express purpose of disintegrating and reducing the material treated to a pulpy mass in the boiler or vessel in which it has been boiled; and to accomplish this disintegration in whole or in part, it has been the custom to boil for very long periods, the express object being in all cases to reduce the material to a pulp, or as nearly so as possible, in the boiler, by dissolving its gums and while the chemical which dissolves them is present. The mass of pulpy matter is then customarily transferred to the beating or rag engine, and there washed free from its dissolved gums and combined chemical solution, said engine being used as a washer and not for the purpose of reducing the material, which has always been more or less reduced in the boiler. The object, I believe, has always been to disintegrate and separate the fibres one from the other and reduce the pulp by dissolving the gums. Patents have been taken for the combination of caustic alkali and certain high degrees of heat for the special object of reducing to pulp in the boiler and before washing the material, said washing being for the purpose of removing the dissolved gums and combined chemical from amongst the already disintegrated fibres. The ordinary beating or rag engine, which was originally designed for reducing rags, cloth, and other like fibrous substances (not crude fibre) to pulp and washing out dirt and coloring matter at the same time, being common in paper-mills, has been and is used for washing such pulpy masses as are the result of boiling crude vegetable fibrous substances in caustic alkaline solutions combined with heat long applied for the purpose of disintegrating the same; and it is evident that in using the beating or rag engine for washing out dissolved gums and chemical from the disintegrated or partially disintegrated mass, the object has been to use the engine as a washer, and only as a beater or disintegrator when, from imperfection in the boiling process or from other causes, the material under treatment has not been uniformly disintegrated, as it was intended to be. My object and intention is exactly opposed to the boiling process, and I am particularly careful not to disintegrate in the boiler or while the chemical is present, as, if I did so, I should waste the fibre in washing out the chemical which reduced it, and also injure its quality by undermining its structure too much and thereby shortening its staple, as I find that where alkaline solutions are used with heat for the purpose of reducing vegetable fibre from the crude state directly to a pulpy mass, material so reduced is unfit for making into paper without the addition of some other long fibre, which has not been subjected to the same treatment, to enable the fibre to make a strong felt, a quality which alkalies and heat sufficient to disintegrate always must destroy. When I use heat I do so only as an accelerator to the softening process, for the purpose of causing the solution more quickly to permeate the pores of the material and soften it. All vegetable fibrous structures, so far as I have observed, are built up in the same order, and consist of fibres built up in series of structures. The first series, or the first natural division, consists of bunches of a second series, built up like and forming a duplicate of the plant of which it is a part. Each of these bunches is built up again of other still finer series of bunches, until, so far as I have been able to see, the very ultimate fibre, if there is such a thing, is an infinitely minute duplicate of the whole plant, and much too fine and minute to be washed by any known means without great loss in washing. All of the various sub-structures of which bamboo seems to be composed appear to be arranged in the same order of series below series, which are joined together by gum or gums which fill up all of the interstices without closing them. These gums are of a pithy and crystalline nature, and appear to be held together by the force of cohesion. This gum is of the same nature throughout the whole structure, which it binds together, giving stiffness and inflexibility to the same. Cold caustic alkaline solutions readily permeate these several structures and soften the gum or gums, destroying the attraction of cohesion and rendering the whole mass soft and yielding, so that the fibres may be separated from each other and from their surrounding gums without any great exertion of mechanical force, and without injuring or breaking the fibre in the separation. But in order to dissolve these gums and separate the fibres by chemical action and without the aid of mechanical force, heat and great heat is necessary in addition to caustic alkaline properties. But when the material is subjected to that chemical action which dissolves the gums, I find that if any, the whole of the gums is dissolved, and the material which should have been only partially disintegrated is reduced to its very ultimate fibre, its structure being so thoroughly undermined and broken up as to be unfit for anything requiring fibrous strength, and so finely disintegrated as to be lost in great proportion during the washing out of the dissolved gums. It is an axiom among paper-makers that no fibre will make good paper unless it is long enough to spin; and the reason that rags, though old and often rotten, make better paper than new fibrous vegetable matter, is because such matter is ruined by the harsh treatment to which it is subjected, and reduced so finely that it cannot be handled. Rags are not so reduced. The fibres of all rags are still perfect, undisintegrated structures or sub-structures, containing gums which have never been dissolved out, and therefore when they are put into the engine it is found that the action of the roll or beater disintegrates or draws out the fibres better than they can be separated by any chemical action. It is plain that if the gums among vegetable fibrous materials are of uniform nature, (and there is no reason to doubt but that they are,) (and if the ultimate fibre is too fine for manipulation or for making into paper except as a part substitute for rags, and this is generally known to be the case,) that when the necessary heat and chemical action are brought to bear, the material, if disintegrated at all, must be disintegrated too much; that is, it is reduced to pulp too soon, because it has to be washed; and this is perhaps the reason that so far the making of paper from crude material has not been attended with perfect success. In addition to the waste of fibre which takes place when chemically disintegrated material is washed free of the spent chemical, a second great waste takes place, when white paper is made, in washing out the bleaching solution, which so decreases the yield of white pulp that it often costs much more than the rags would do which it is intended to substitute. In my method of separating crude fibrous material I do not dissolve the gums, nor do I disintegrate the material till after I have washed it. Then, if the object is to make white paper, I only partially disintegrate it preparatory to bleaching it, after which I wash out the bleach and reduce it to pulp in the beating or rag engine, using the engine as a disintegrator and not as a washer, by which means I avoid all waste and produce a better material at a less gross cost; that is to say, I treat a given quantity at a less expense and obtain a greater quantity of fibre than by a chemically-reducing process would be possible, as I do not reduce the material to pulp until all the manipulation is over, and when I have reduced it to pulp I convey it to the paper machine in the water in which it was beaten to pulp, while by all other methods of proceeding the material is boiled into pulp or sought to be so, then placed in the engine to wash it, not to disintegrate it, because it is already disintegrated too much.

I am aware that beating engines have been and are used for washing material which has been previously disintegrated or partially disintegrated by boiling. I am also aware the beating engines are and have been used for further disintegrating rags, cloth, hemp tow, bagging, &c., which cannot be considered crude fibre, being already to a certain extent disintegrated. I do not claim the use of a beating engine for either of these purposes. But I am not aware that such engines are or ever have been used for the purpose of separating the fibres of crude vegetable matter, as such fibres have always heretofore been disintegrated by boiling and chemical action, so as to have entirely lost their conformation and characteristics before being placed into the beating engine. I am also aware that caustic alkaline solutions have been used for disintegrating and reducing crude vegetable fibrous productions to pulp or to a pulpy mass, in conjunction with heat. I do not claim the use of caustic alkalies for this purpose. But I am not aware that such solutions have ever been used for softening but not disintegrating crude material as a preparatory treatment to its mechanical disintegration. Nor am I aware that any chemical treatment has ever been applied to crude vegetable fibrous matter for the purpose of desiccating, condensing, or curing such material, or for the purpose of reducing the cost of transportation of the same as a fibrous material, as I have described, prepared for shipment, storage, and future disintegration.

I do not limit myself to any particular vegetable fibrous production, as all crude fibrous matter may be advantageously treated as I have described. Nor do I limit myself to any particular means for mechanically disintegrating bamboo or other fibrous material which has been prepared for such disintegration by being softened as I describe. Nor do I limit myself to any particular time for such disintegration, whether before or after washing the softened matter, although I prefer to first wash it, for the reasons set forth. Nor do I limit myself to any kind of chemical treatment for the purpose of preparing crude vegetable fibrous material to be baled compactly, when such treatment is for the purpose of destroying insect life or economizing bulk and lowering the cost of transportation, as it would be worth while, for this purpose, to use other chemical agents than alkalies, even though the cost of such chemical treatment was an additional cost to the ultimate product, but I prefer to use alkalies for the reasons set forth.

I do not claim broadly the preparation of pulp or disintegrated fibre from bamboo or other fibrous productions; nor do I claim the production of balls or bales of cane or bamboo fibre as an article of commerce, except when the same have been disintegrated mechanically after softening the crude material, as I have described in this and my previous specifications.

I do not limit myself to any particular use for the fibre extracted by my process, as it is equally superior to fibre extracted by other processes for any purpose where fibre is or may be used, whether for paper-making or for the purpose of making soft-felted fabrics, either alone or mixed with other material, or for the purpose of string or rope-making, or for textile fabrics. By my process fibres can be extracted from bamboo which can be mixed with linen or silk, or it can be spun and woven alone without admixture with other material.

What I claim as my invention and as new, and desire to secure by Letters Patent of the United States, is—

1. Subjecting crude vegetable fibrous material to any chemical treatment which softens and shrinks its bulk without disintegrating the same, for the purpose set forth and described, as a new article of commerce.

2. Preparing bamboo or other crude vegetable fibrous matter for transportation and for subsequent disintegration, as a fibre-producing material, by means of an alkaline or caustic alkaline solution.

3. Softening and preparing bamboo or other crude vegetable fibrous matter by means of an alkaline solution, when so applied as not to disintegrate the material, but simply to prepare it for mechanical reduction, as fully set forth.

4. The process of disintegrating bamboo or other like crude vegetable fibrous matter, by means of the beating or rag engine or its mechanical equivalent, when such bamboo or other fibrous matter has not been reduced to a pulpy mass by chemical action, or when the material has not been previously subjected to a treatment which destroys its woody conformation, but has been prepared for mechanical disintegration by being softened in an alkaline solution.

CHAS. HEATON.

Witnesses:
ALEXANDER G. BLACK,
W. S. SWYMMER.